(12) United States Patent
Zhang et al.

(10) Patent No.: US 11,388,568 B2
(45) Date of Patent: Jul. 12, 2022

(54) MTC KEY MANAGEMENT FOR SENDING KEY FROM NETWORK TO UE

(71) Applicant: NEC Corporation, Tokyo (JP)

(72) Inventors: Xiaowei Zhang, Tokyo (JP); Anand Raghawa Prasad, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/505,060

(22) Filed: Jul. 8, 2019

(65) Prior Publication Data

US 2019/0335329 A1 Oct. 31, 2019

Related U.S. Application Data

(62) Division of application No. 14/646,523, filed as application No. PCT/JP2013/007092 on Dec. 3, 2013, now Pat. No. 10,412,579.

(30) Foreign Application Priority Data

Dec. 6, 2012 (JP) ................................. 2012-267256

(51) Int. Cl.
*H04W 4/70* (2018.01)
*H04W 12/00* (2021.01)
(Continued)

(52) U.S. Cl.
CPC ............ *H04W 4/70* (2018.02); *H04W 12/02* (2013.01); *H04W 12/03* (2021.01);
(Continued)

(58) Field of Classification Search
CPC ..... H04W 4/005; H04W 12/00; H04W 12/04; H04W 12/06; H04L 63/0884; H04L 63/0892; H04L 63/0471
See application file for complete search history.

(56) References Cited

U.S. PATENT DOCUMENTS 8,861,732 B2 * 10/2014 Suh .................... H04W 4/60
380/255
9,191,818 B2 11/2015 Larsson
(Continued)

FOREIGN PATENT DOCUMENTS

| EP | 2 530 963 | 12/2012 |
| WO | WO 2011/152665 | 12/2011 |
| WO | WO 2012/068094 | 5/2012 |

OTHER PUBLICATIONS

European Search Report, EP 19 19 3175, dated Nov. 5, 2019.
(Continued)

*Primary Examiner* — Daniel B Potratz

(57) ABSTRACT

A root key (K_iwf) is derived at a network and sent to MTC UE (10). The K_iwf is used for deriving subkeys for protecting communication between MTC UE (10) and MTC-IWF (20). In a case where HSS (30) derives the K_iwf, HSS (30) send to MTC-IWF (20) the K_iwf in a new message (Update Subscriber Information). In a case where MME (40) derives the K_iwf, MME (40) sends the K_iwf through HSS (30) or directly to MTC-IWF (20). MTC-IWF (20) can derive the K_iwf itself. The K_iwf is sent through MME (40) to MTC UE (10) by use of a NAS SMC or Attach Accept message, or sent from MTC-IWF (20) directly to MTC UE (10). In a case where the K_iwf is sent from MME (40), MME (40) receives the K_iwf from HSS (30) in an Authentication Data Response message, or from MTC-IWF (20) directly.

12 Claims, 5 Drawing Sheets

(51) Int. Cl.
*H04W 12/02* (2009.01)
*H04W 12/03* (2021.01)
*H04W 12/041* (2021.01)
*H04W 12/0431* (2021.01)
*H04W 12/0471* (2021.01)
*H04L 9/40* (2022.01)
*H04W 88/16* (2009.01)

(52) U.S. Cl.
CPC ..... *H04W 12/041* (2021.01); *H04W 12/0431* (2021.01); *H04W 12/0471* (2021.01); *H04L 63/065* (2013.01); *H04L 2463/061* (2013.01); *H04W 12/00* (2013.01); *H04W 88/16* (2013.01)

(56) References Cited

U.S. PATENT DOCUMENTS

| | | | |
|---|---|---|---|
| 9,253,178 B2* | 2/2016 | Blom | H04L 9/3271 |
| 2007/0249352 A1 | 10/2007 | Song | |
| 2009/0172397 A1* | 7/2009 | Kim | H04L 65/1046 |
| | | | 713/168 |
| 2011/0296181 A1 | 12/2011 | Barriga | |
| 2012/0297193 A1 | 11/2012 | Liu | |
| 2012/0297473 A1 | 11/2012 | Case et al. | |
| 2013/0080597 A1 | 3/2013 | Liao | |
| 2013/0080782 A1* | 3/2013 | Rajadurai | H04L 9/08 |
| | | | 713/171 |
| 2014/0096253 A1 | 4/2014 | Garcia | |
| 2014/0134996 A1 | 5/2014 | Barclay | |
| 2014/0219182 A1 | 8/2014 | Chandramouli | |
| 2015/0208232 A1 | 7/2015 | Liebhart | |

OTHER PUBLICATIONS

European Search Report, EP 19 19 3175, dated Oct. 28, 2019.
3rd Generation Partnership Project Technical Specification Group Services and System Aspects; Machine-Type and other Mobile Data Applications Communications Enhancements (Release 12), 3GPP Draft; 23.887-040RM, Nov. 29, 2012.
LG Electronics: "The architectural requirements on T5 device trigger", 3GPP draft; S2-122801 Jul. 3, 2013.
International Search Report, PCT/JP2013/007092, dated Jun. 3, 2014.
NEC Corporation: "Secure Trigger Delivery with Security Association between MTC-IWF and UE", 3GPP Draft; S3-121116, 3rd Generation, Partnership Project (3GPP), Mobile Competence Centre ; 650, Route Des Lucioles ; F-06921 Sophia-Antipolis Cedex; France, Oct. 29, 2012 (Oct. 29, 2012), XP050685553, Retrieved from the Internet: URL:http://www.3gpp.org/ftp/tsg sa/WG3 Security/ TSGS3 69 Edinburgh/Docs/ [retrieved on Oct. 29, 2012] p. 5, line 39—p. 6, line 14.
3GPP TR 23.887 V0.3.0 (Oct. 2012), 3rd Generation Partnership Project; Technical Specification Group Services and System Aspect; Machine-Type and other Mobile Data Applications Communication s Enhancements (Release12).
3GPP TR 33.868 V0.10.0 (Sep. 2012), 3rd Generation Partnership Project; Technical Specification Group Services and System Aspects; Security aspects of Machine-Type and other Mobile Data Applications Communications Enhancements; (Release 12).
Japanese Office Action dated May 17, 2016 in corresponding Japanese Patent Application No. 2015-523727.
3GPP TSG SA WG3 (Security) Meeting #70, Jan. 21-25, 2013; Sophia Antipolis, France, S3-130101, "Security Association between MTC-IWF and UE".
NEC Corporation, "pCR Secure Trigger Delivery with Security Association between MTC-IWF and UE", Nov. 2012, 3GPP TSG SA WG3 (Security) Meeting #69, S3-121117.
Japanese Office Action dated Mar. 6, 2018 in corresponding Japanese Patent Application No. 2016-254703 with JPO machine translation of Japanese Office Action.
3GPP TS 23.682 V11.2.0 (Sep. 2012), 3rd Generation Partnership Project; Technical Specification Group Services and System Aspects; Architecture enhancements to facilitate communications with packet data networks and applications (Release 11), URL, http://www. 3gpp.org/ftp/Specs/archive/23_series/23.682/23.682-b20.zip.
LG Electronics: "The architectural requirements on T5 device trigger", 3GPP draft; S2-122801 Jul. 3, 2012.
3GPP TSG SA WG3 (Security) Meeting #69; NEC Corporation; "pCR Secure Trigger Delivery with Security Association between MTC-IWP and UE", 3GPP Draft; S3-121117, 3rd Generation Partnership Project (3GPP), Mobile Competence Centre; 650 Route Des Lucioles; F-06921 Sophia-Antipolis Cedex, France; vol. SA WG3, No. Edinburgh, Scotland. Nov. 5, 2012-Nov. 9, 2012, Oct. 29, 2012 (Oct. 29, 2012), XP050685554.
3GPP TR 33.868 V0.11.0 (Nov. 2012) "3rd Generation Partnership Project; Technical Specification Group services and System Aspects, Security aspects of Machine-Type and other Mobile Data Applications Communications Enhancements: (Release 12)", 3GPP Draft S3-121173 TR33868-0BO-RM, 3rd Generation Partnership Project (3GPP), Mobile Competence Centre; 650 Route Des Lucioles; F-06921 Sophia-Antipolis Cedex; France, Nov. 12, 2012 (Nov. 12, 2012), XP050685614.

* cited by examiner

[Fig. 2]
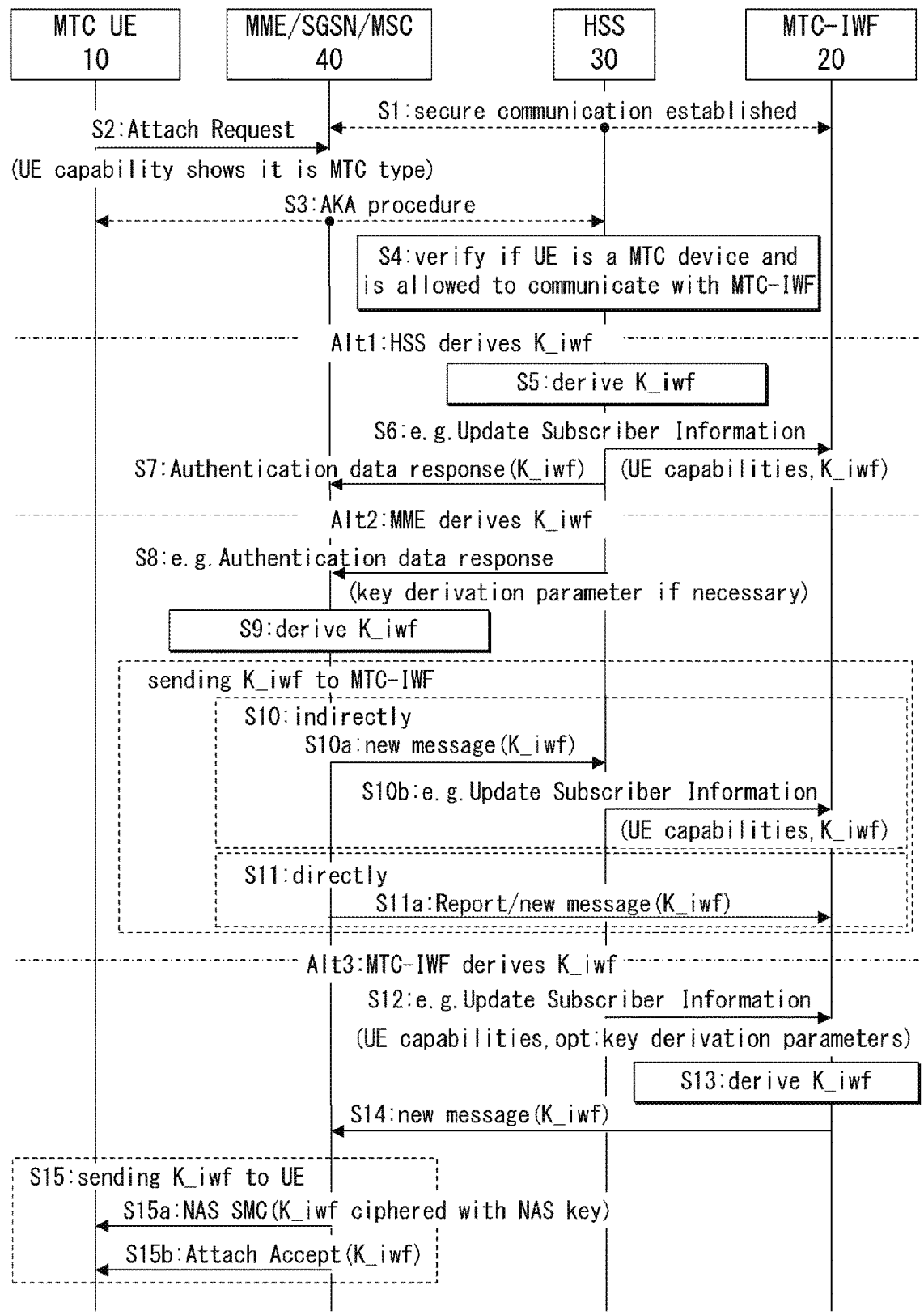

[Fig. 3]
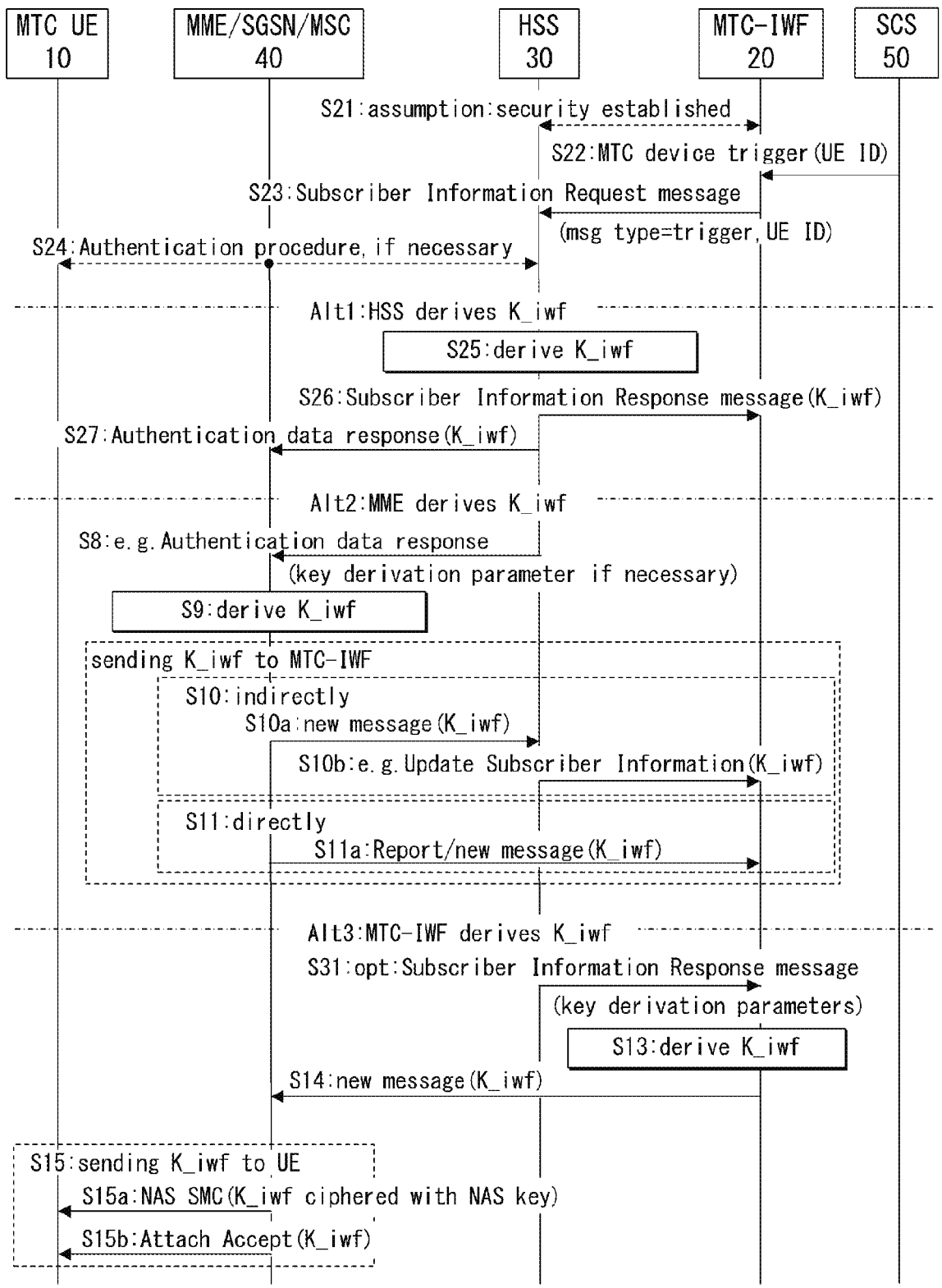

[Fig. 4]
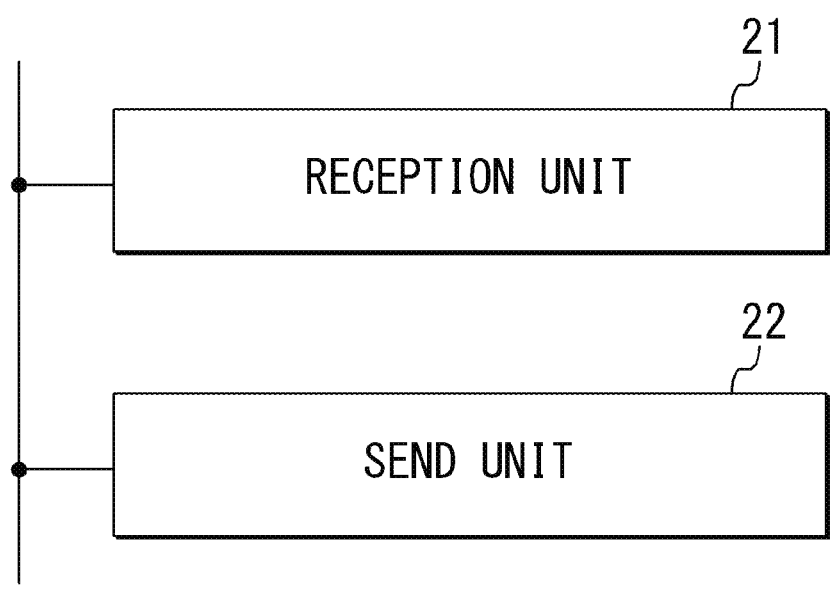
[Fig. 5]
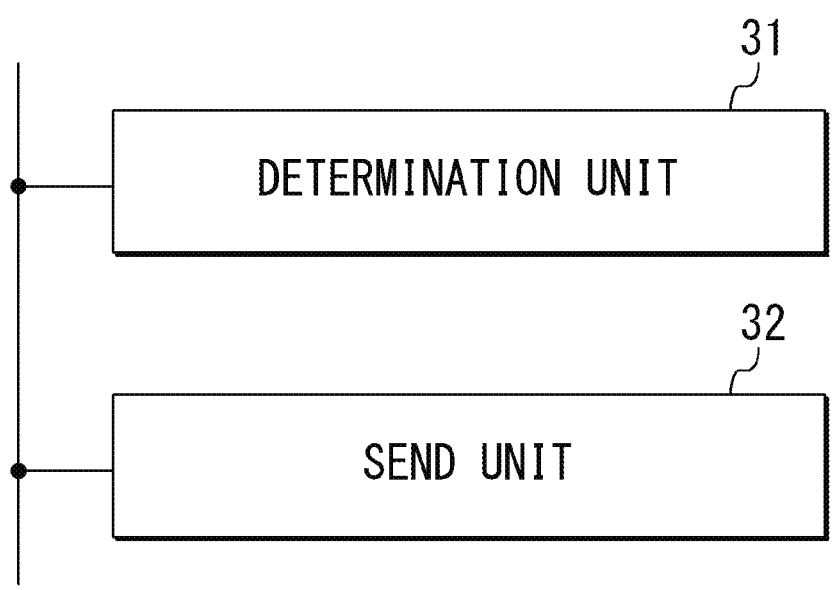

SEND UNIT 41

MTC KEY MANAGEMENT FOR SENDING KEY FROM NETWORK TO UE

TECHNICAL FIELD

The present invention relates to key management in MTC (Machine-Type Communication) system, in particular to a technique to send a key from a network to a MTC UE (User Equipment), for securing communication between an MTC-IWF (MTC Inter-Working Function) and the MTC UE.

BACKGROUND ART

As described in NPL 1, the security over the interface between an MTC device and an MTC-IWF should be studied. Note that the MTC Device is a UE equipped for MTC, which will be sometimes referred to as "MTC UE" or "UE" in the following explanation.

CITATION LIST

Non Patent Literature

NPL 1: 3GPP TR 33.868, "Security aspects of Machine-Type and other Mobile Data Applications Communications Enhancements; (Release 12)", V0.10.0, 2012-09
NPL 2: 3GPP TR 23.887, "Machine-Type and other Mobile Data Applications Communications Enhancements (Release 12)", V0.3.0, 2012-10

SUMMARY OF INVENTION

Technical Problem

However, in 3GPP (3rd Generation Partnership Project), the study has not been fulfilled. Therefore, secure communication solution is required between an MTC device and an MTC-IWF.

Accordingly, an exemplary object of the present invention is to ensure secure communication between an MTC device and an MTC-IWF.

Solution to Problem

In order to achieve the above-mentioned object, this invention deals with the following issues:

How the root key K_iwf is derived at network and being sent to UE.

This invention provides the solution of network deriving the root key K_iwf for secure communication purpose between UE and MTC-IWF and sending K_iwf to UE. Note that the network here means the network node which derives key K_iwf. There are multiple options for which network node to derive key K_iwf. This applies to the description through this invention.

Advantageous Effects of Invention

According to the present invention, it is possible to solve the above-mentioned problems, and thus to ensure secure communication between an MTC device and an MTC-IWF.

BRIEF DESCRIPTION OF DRAWINGS

FIG. 2 is a sequence diagram showing an operation example of key sending to UE when communication initiated by UE, in the communication system according to the exemplary embodiment.

FIG. 3 is a sequence diagram showing an operation example of key sending to UE when communication initiated by trigger, in the communication system according to the exemplary embodiment.

FIG. 4 is a block diagram showing a configuration example of a first network node according to the exemplary embodiment.

FIG. 5 is a block diagram showing a configuration example of a second network node according to the exemplary embodiment.

FIG. 6 is a block diagram showing a configuration example of a third network node according to the exemplary embodiment.

DESCRIPTION OF EMBODIMENTS

Figure 1:
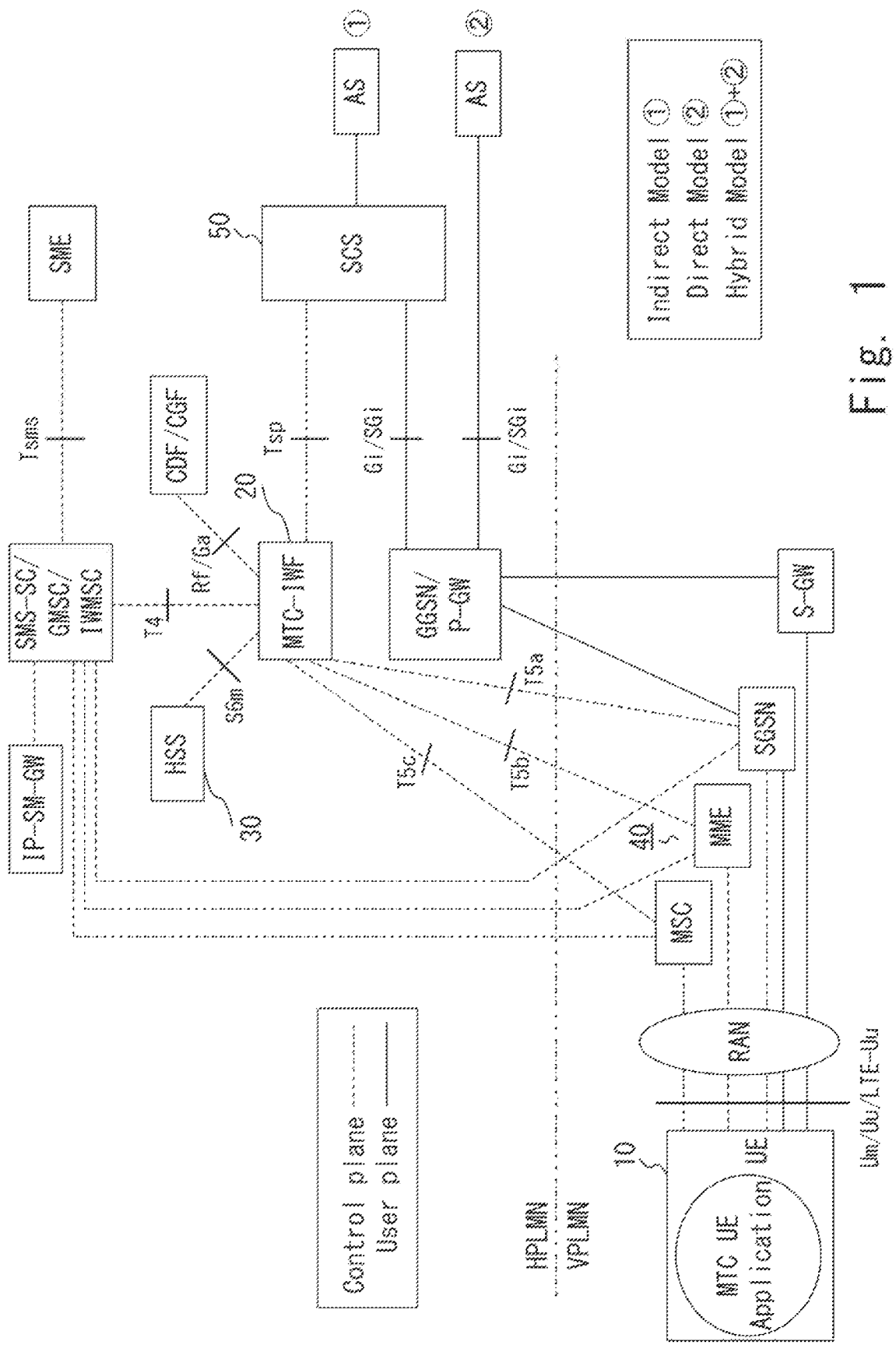
FIG. 1 is a block diagram showing a configuration example of a communication system according to an exemplary embodiment of the present invention.

Hereinafter, an exemplary embodiment of the present invention will be described with the accompany drawings.

As shown in FIG. 1, a communication system according to this exemplary embodiment includes a core network (3GPP network), and one or more MTC UEs 10 which are UEs equipped for MTC and connect to the core network through a RAN (Radio Access Network). While the illustration is omitted, the RAN is formed by a plurality of base stations (i.e., eNBs (evolved Node Bs)).

The MTC UE 10 attaches to the core network. The MTC UE 10 can host one or multiple MTC Applications. The corresponding MTC Applications in the external network are hosted on an SCS (Service Capability Server) 50. The SCS 50 connects to the core network to communicate with the MTC UE 10.

Further, the core network includes an MTC-IWF 20 as one of its network nodes. The MTC-IWF 20 serves as a gateway to the core network for the SCS 50. The MTC-IWF 20 relays messages between the MTC UE 10 and the SCS 50. The core network includes, as other network nodes, an HSS (Home Subscriber Server) 30, an MME (Mobility Management Entity), an SGSN (Serving GPRS (General Packet Radio Service) Support Node), an MSC (Mobile Switching Centre) and the like. In the following description, the MME, SGSN and MSC are sometimes referred to as "MME/SGSN/MSC", and collectively or individually denoted by the symbol 40. Communication between the MTC UE 10 and the MTC-IWF 20 is conducted through the MME/SGSN/MSC 40.

Next, operation examples of this exemplary embodiment will be described in detail with reference to FIGS. 2 and 3.

1. Initialization (Key Provision)

There are three options for which network node to derive the root key K_iwf, i.e., HSS 30, MME/SGSN/MSC 40 or MTC-IWF 20.

Thereafter there are three ways of how key K_iwf is provided to MTC-IWF 20.

1) HSS 30 derives the root key K_iwf and sends it to MTC-IWF 20 in for example Subscriber Information Response (described in NPL 2), or a new message which is called Update Subscriber Information. The K_iwf sending is after AKA (Authentication and Key Management) procedure with UE 10 is successfully completed. K_iwf is also sent to MME 40 in Authentication Data Response for example, such that MME 40 later can send it to UE 10. Note that in the following explanation, description as to the MME is similarly applied to the SGSN and the MSC.

2) MME 40 derives the root key K_iwf and sends it to MTC-IWF 20 via HSS 30 or directly with a new message (for example Report message including report.type="UE is authenticated", UE ID, K_iwf).

3) MTC-IWF 20 itself derives the root key K_iwf. MTC-IWF 20 sends K_iwf to MME 40 over interface T5 shown in FIG. 1, such that MME 40 later can send it to UE 10.

Both UE 10 and network (e.g., triggered by SCS 50) can initiate a communication to the other end. Therefore sending root key K_iwf to UE 10 is different in each case. In the following the key sending will be described.

2. Detailed Description of Root Key K_iwf Sending Procedure

<Case 1: UE Initiates Communication>

The root key K_iwf should be derived after HSS 30 verified that the UE 10 is allowed to have MTC type communication and authenticated to network. K_iwf can be sent to UE 10 during the first Attach procedure or once the first Attach procedure is completed.

The root key K_iwf can be sent from MME 40 to UE 10 in NAS (Non Access Stratum) SMC (Security Mode Command) or Attach Accept message, when NAS security confidentiality is started. When K_iwf is sent in NAS SMC message, it should be protected by NAS confidentiality key. When K_iwf is sent in Attach Accept message, the key itself does not need protection when the Attach Accept message is confidentially protected with NAS security context. MME 40 can either derive K_iwf itself or receive it from HSS 30 or MTC-IWF 20 as described above.

The details are shown in FIG. 2.

Step S1: Secure communication is established between the network nodes, MME/SGSN/MSC 40, HSS 30 and MTC-IWF 20.

Step S2: UE 10 sends Attach Request to MME 40 with UE capability showing it is MTC type UE.

Step S3: The standard AKA procedure can be started.

Step S4: According to the UE capability, HSS 30 verifies if the UE 10 is a MTC device and if it is allowed to communicate with MTC-IWF 20. If the verification is successfully completed, the key derivation and sending will be carried out.

Steps S5 to S7: In case that the HSS 30 derives root key K_iwf, it sends the key to MTC-IWF 20 in a new message which can be called "Update Subscriber Information" with UE capabilities included. Meanwhile, it sends K_iwf to MME 40 in Authentication Data Response message.

Steps S8 to S11: In case that MME 40 derives the root key K_iwf, HSS 30 sends the parameter (if necessary) in Authentication Data Response message to MME 40. After MME 40 derived K_iwf, it can send it to MTC-IWF 20 in two ways.

One (steps S10a and S10b) is that MME 40 sends K_iwf in a new message to HSS 30, then HSS 30 sends it to MTC-IWF 20 in a new message called Update Subscriber Information message.

The other way (step S11) is that MME 40 directly sends K_iwf over interface T5 in a new message or in a Report message to MTC-IWF 20.

Steps S12 to S14: In case that MTC-IWF 20 derives the root key K_iwf, HSS 30 sends the key derivation parameters if necessary in a new message called Update Subscriber Information. After MTC-IWF 20 derived K_iwf, it sends K_iwf to MME 40 over interface T5 in a new message.

Step S15: MME 40 sends the root key K_iwf in either NAS SMC, with K_iwf encrypted by NAS security context or Attach Accept message with confidentiality security.

<Case 2: Communications Initiated by Trigger>

In the same way, the key K_iwf is derived at network and it is sent to the UE 10. Either the key itself or the required key derivation parameter is sent to the MTC-IWF 20.

The details are shown in FIG. 3.

Step S21: The secure communication is established between HSS 30 and MTC-IWF 20.

Step S22: SCS 50 sends a MTC device trigger to MTC-IWF 20, containing the UE ID it triggers.

Step S23: MTC-IWF 20 sends Subscriber Information Request message to HSS 30, including message type as trigger and the UE ID.

Step S24: Authentication with UE 10 is carried if UE 10 has not been authenticated yet.

Steps S25 to S27: When the HSS 30 derives root key K_iwf, it sends the key to MTC-IWF 20 in Subscriber Information Response message. Meanwhile, it sends K_iwf to MME 40 in Authentication Data Response message.

Steps S8 to S11: This procedure is the same with Case 1.

Step S31: In case that MTC-IWF 20 derives the root key K_iwf, HSS 30 sends the key derivation parameters if necessary in Subscriber Information Response message. After MTC-IWF 20 derived K_iwf, it sends K_iwf to MME 40 over interface T5 in a new message.

Steps S13 to S15: This procedure is the same with Case 1.

Note that in steps S6, S10 and S12 of Case 1, Update Subscriber Information is used as an example of a new message. HSS 30 can also wait till next Subscriber Information Request received from MTC-IWF 20 then it can send K_iwf in Subscriber Information Response message.

HSS 30 can have the key derivation parameter installed or receives it from MTC-IWF 20. MME 40 can also receive the key derivation parameter from MTC-IWF 20 instead of HSS 30.

Alternatively, MTC-IWF 20 can send K_iwf directly to UE 10. In this case K_iwf does not need to be sent to MME 40, thus Steps S7, S15 and S27 are not needed.

Alternatively, MTC-IWF 20 can derive and send K_iwf to HSS 30 before even AKA procedure started and HSS 30 can send K_iwf to UE 10 once it is authenticated.

Network can alternatively send the subkeys to UE 10 instead of sending the root key. In this case, UE 10 does not need to derive the sub keys at its side which will be described later. This has less impact to UE but on the other hand increase signaling with network.

Since a UE may not be allowed to communicate with MTC-IWF (not a MTC device) or an UE may not request communication with MTC-IWF, the new key hierarchy should not be established in such cases.

3. Subkey and Message Protection

When UE 10 and MTC-IWF 20 have the root key K_iwf they can derive subkeys K_di_conf and K_di_int. The subkey K_di_conf is a confidentiality key for encrypting and decrypting messages transferred between the MTC UE 10 and the MTC-IWF 20. The subkey K_di_int is an integrity key for checking the integrity of messages transferred between the MTC UE 10 and the MTC-IWF 20. The communication between UE 10 and MTC-IWF 20 should be both confidentiality and integrity protected by the sub keys.

When MTC-IWF 20 receives a message from UE 10 which is protected by a different key that MTC-IWF 20 holds, it should discard the message. s an option it can inform HSS 30, such that HSS 30 can take on proper action for example key renew procedure, UE re-authentication or detach.

When UE 10 receives a message from MTC-IWF 20 which is protected by a different key that UE 10 holds, it can request for a new key.

Next, configuration examples of the MTC-IWF 20, the HSS 30 and the MME/SGSN/MSC 40 according to this exemplary embodiment will be described with reference to FIGS. 4 to 6. Note that in the following explanation, there will be described only elements which are specific to this exemplary embodiment. However, it will be understood that the MTC-IWF 20, the HSS 30 and the MME/SGSN/MSC 40 also include elements for functioning as typical MTC-IWF, HSS and MME/SGSN/MSC, respectively.

As shown in FIG. 4, the MTC-IWF 20 includes at least one of a reception unit 21 and a send unit 22. In the case where the HSS 30 or the MME/SGSN/MSC 40 derives the root key K_iwf, the reception unit 21 receives the root key K_iwf directly from the MME/SGSN/MSC 40, or through the HSS 30 as shown at steps S6, S10 and S11 in FIG. 2, and shown at step S26 in FIG. 3. The send unit 22 can send the key derivation parameters to the HSS 30 or the MME/SGSN/MSC 40. Moreover, the send unit 22 can send the root key K_iwf directly to the MEC UE 10. Note that these units 21 and 22 are mutually connected with each other through a bus or the like. These units 21 and 22 can be configured by, for example, transceivers which respectively conduct communication with the HSS 30 and the MME/SGSN/MSC 40, and a controller such as a CPU (Central Processing Unit) which controls these transceivers.

As shown in FIG. 5, the HSS 30 includes at least one of a determination unit 31 and a send unit 32. The determination unit 31 performs the verification as shown at step S4 in FIG. 2. In the case where the HSS 30 derives the root key K_iwf, the send unit 32 sends the root key K_iwf to the MTC-IWF 20 and the MME/SGSN/MSC 40 as shown at steps S6 and S7 in FIG. 2, and shown at steps S26 and S27 in FIG. 3. On the other hand, in the case where the MTC-IWF 20 or the MME/SGSN/MSC 40 derives the root key K_iwf, the send unit 32 can send the key derivation parameters to the MTC-IWF 20 or the MME/SGSN/MSC 40 as shown at steps S8 and S12 in FIG. 2, and shown at step S31 in FIG. 3. Note that these units 31 and 32 are mutually connected with each other through a bus or the like. These units 31 and 32 can be configured by, for example, transceivers which respectively conduct communication with the MTC-IWF 20 and the MME/SGSN/MSC 40, and a controller such as a CPU which controls these transceivers.

Figure 6:
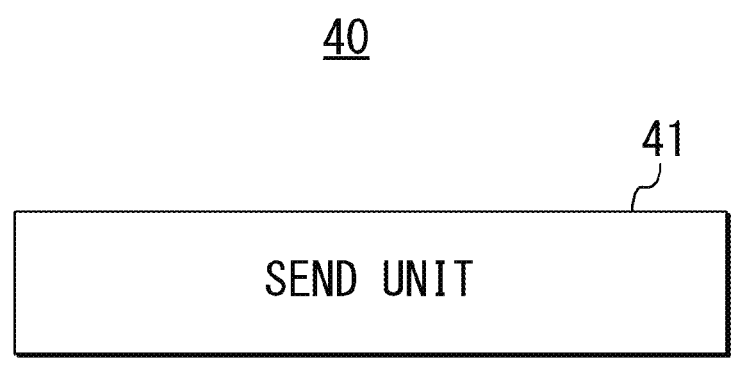

As shown in FIG. 6, the MME/SGSN/MSC 40 includes a send unit 41. The send unit 31 sends the root key K_iwf to the MTC UE 10 as shown at step S15 in respective FIGS. 2 and 4. In the case where the MME/SGSN/MSC 40 derives the root key K_iwf, the send unit 31 sends the root key K_iwf directly to the MTC-IWF 20, or through the HSS 30 as shown at steps S10 and S11 in respective FIGS. 2 and 3. This send unit 31 can be configured by, for example, transceivers which respectively conduct communication with the MTC UE 10, the MTC-IWF 20 and the HSS 30, and a controller such as a CPU which controls these transceivers.

Note that the present invention is not limited to the above-mentioned exemplary embodiment, and it is obvious that various modifications can be made by those of ordinary skill in the art based on the recitation of the claims.

The whole or part of the exemplary embodiment disclosed above can be described as, but not limited to, the following supplementary notes.

(Supplementary Note 1)

Network determines whether UE can have MTC communication and K_iwf can only be sent to MTC type UE.

(Supplementary Note 2)

MME sends K_iwf to UE in NAS SMC or Attach Accept message, and sends the key to MTC-IWF over T5 interface for example in Report message; or through HSS in Subscriber Information Response message or a new message "Update Subscriber Information".

(Supplementary Note 3)

HSS derives the key K_iwf and sends it to UE through MME, and sends the key to MTC-IWF in Subscriber Response message or a new message "Update Subscriber Information".

(Supplementary Note 4)

MTC-IWF derives the key K_iwf. After the derivation or receiving if from HSS or MME, it sends K_iwf to UE through MME or in a direct message.

(Supplementary Note 5)

HSS sends the key derivation parameter to MME in Authentication Data Response, or alternatively MTC-IWF provides the key derivation parameters to MME.

(Supplementary Note 6)

HSS sends the key derivation parameter to MTC-IWF in Subscriber Information Response message or a new message "Update Subscriber Information", or alternatively MTC-IWF provides the key derivation parameter to HSS.

This application is based upon and claims the benefit of priority from Japanese patent application No. 2012-267256, filed on Dec. 6, 2012, the disclosure of which is incorporated herein in its entirety by reference.

REFERENCE SIGNS LIST

10 MTC UE
20 MTC-IWF
21 RECEPTION UNIT
22, 32, 41 SEND UNIT
30 HSS
31 DETERMINATION UNIT
40 MME/SGSN/MSC
50 SCS

The invention claimed is:

1. A User Equipment (UE) in a mobile communication system including a first network node, a second network node, and a third network node, the first network node communicatively coupled between the UE and the second network node, the UE comprising:
at least one processor; and
at least one memory coupled to the at least one processor, the at least one memory storing instructions that when executed by the at least one processor, cause the at least one processor to:
send, to the first network node, a first message including capability information,
receive a second message, from the first network node, wherein the first network node receives, from the third network node, a third message including key information related to derivation of a first key, derives the first key based on the key information, and sends a fourth message including the first key to the second network node that derives a confidentiality key and an integrity key from the first key,
derive the confidentiality key and the integrity key from the first key based on the receipt of the second message, and
encrypt and decrypt messages between the UE and the second network node using the confidentiality key.

2. The UE of claim 1, wherein the capability information indicates that the UE is a Machine Type Communication (MTC) type UE that can host an MTC service.

3. The UE of claim 1, wherein the instructions stored in the at least one memory further comprise instructions that when executed by the at least one processor, cause the at least one processor to perform secure communication with the second network node using the confidentiality key and the integrity key.

4. A method of a User Equipment (UE), in a mobile communication system including a first network node, a second network node, and a third network node, the first network node communicatively coupled between the UE and the second network node, the method comprising:
   sending, to the first network node, a first message including capability information;
   receiving a second message, from the first network node, wherein the first network node receives, from the third network node, a third message including key information related to derivation of a first key, derives the first key based on the key information, and sends a fourth message including the first key to the second network node that derives a confidentiality key and an integrity key from the first key;
   deriving the confidentiality key and the integrity key from the first key based on the receipt of the second message; and
   encrypting and decrypting messages between the UE and the second network node using the confidentiality key.

5. The method of claim 4, wherein the capability information indicates that the UE is a Machine Type Communication (MTC) type UE that can host an MTC service.

6. The method of claim 4, further comprising performing secure communication with the second network node using the confidentiality key and the integrity key.

7. A first network node in a mobile communication system including a User Equipment (UE), a second network node, and a third network node, the first network node communicatively coupled between the UE and the second network node, the first network node comprising:
   at least one processor; and
   at least one memory coupled to the at least one processor, the at least one memory storing instructions that when executed by the at least one processor, cause the at least one processor to:
      receive, from the UE, a first message including capability information,
      send a second message to the UE,
      receive, from the third network node, a third message including key information related to derivation of a first key,
      derive the first key based on the key information, and
      send a fourth message including the first key to the second network node, wherein the second network node derives a confidentiality key and an integrity key from the first key and performs secure communication with the UE using the confidentiality key and the integrity key.

8. The first network node of claim 7, wherein the capability information indicates that the UE is a Machine Type Communication (MTC) type UE that can host an MTC service.

9. The first network node of claim 7, wherein the UE derives the confidentiality key and the integrity key from the first key based on the receipt of the second message.

10. A method of a first network node in a mobile communication system including a User Equipment (UE), a second network node, and a third network node, the first network node communicatively coupled between the UE and the second network node, the method comprising:
    receiving, from the UE, a first message including capability information;
    sending a second message to the UE;
    receiving, from the third network node, a third message including key information related to derivation of a first key;
    deriving the first key based on the key information; and
    sending a fourth message including the first key to the second network node, wherein the second network node derives a confidentiality key and an integrity key from the first key and performs secure communication with the UE using the confidentiality key and the integrity key.

11. The method of claim 10, wherein the capability information indicates that the UE is a Machine Type Communication (MTC) type UE that can host an MTC service.

12. The method of claim 10, wherein the UE derives the confidentiality key and the integrity key from the first key based on the receipt of the second message.

* * * * *